(12) United States Patent
Böhm et al.

(10) Patent No.: US 6,863,339 B2
(45) Date of Patent: Mar. 8, 2005

(54) COMPOSITE PART FOR A VEHICLE BODY

(75) Inventors: Horst Böhm, Frankfurt am Main (DE); Rainer Grimm, Frankfurt am Main (DE); Karl Hörmann, Langdorf (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/389,313

(22) Filed: Mar. 14, 2003

(65) Prior Publication Data

US 2003/0173801 A1 Sep. 18, 2003

(30) Foreign Application Priority Data

Mar. 14, 2002 (DE) .......................................... 102 11 734

(51) Int. Cl.[7] .............................................. B62D 25/02
(52) U.S. Cl. ................ 296/191; 296/181.03; 52/588.1; 52/578
(58) Field of Search .......................... 296/181.1, 181.2, 296/181.3, 181.6, 191; 52/578, 579, 582.1, 588.1

(56) References Cited

U.S. PATENT DOCUMENTS

| | | | | | |
|---|---|---|---|---|---|
| 3,711,148 | A | * | 1/1973 | Hindin | ..................... 296/181.6 |
| 5,067,759 | A | | 11/1991 | Fleming | |
| 5,772,276 | A | * | 6/1998 | Fetz et al. | ................ 296/181.6 |
| 5,934,741 | A | * | 8/1999 | Beukers et al. | ........... 296/181.6 |
| 5,992,117 | A | * | 11/1999 | Schmidt | ..................... 52/582.1 |
| 6,626,622 | B2 | * | 9/2003 | Zubko | .......................... 410/113 |
| 2002/0093225 | A1 | * | 7/2002 | Grimm | ......................... 296/210 |
| 2002/0098053 | A1 | | 7/2002 | Zubko | |

FOREIGN PATENT DOCUMENTS

| | | |
|---|---|---|
| DE | 31 25 137 A1 | 3/1982 |
| DE | 34 47 424 A1 | 7/1985 |
| EP | 1 088 746 A2 | 4/2001 |
| GB | 2 044 187 A | 10/1980 |
| GB | 2 178 703 A | 2/1987 |
| GB | 2 185 714 A | 7/1987 |

OTHER PUBLICATIONS

European Search Report, Jun. 29, 2004.
Search report, dated May 14, 2002.

* cited by examiner

*Primary Examiner*—Jason Morrow
(74) *Attorney, Agent, or Firm*—Carlson, Gaskey & Olds

(57) ABSTRACT

A composite part for use as a vehicle panel comprises an outer wall, a foamed backing and a reinforcement insert embedded in the foamed backing. The foamed backing leaves portions of the reinforcement insert exposed to form at least two fastening regions. The reinforcement insert has at least two fastening regions for fastening the composite part to an adjacent composite part. A first fastening region is located at a first distance from the rear surface of the outer wall, and a second fastening region is located at a second distance from the rear surface of the outer wall that is greater than the first distance.

30 Claims, 4 Drawing Sheets

US 6,863,339 B2

COMPOSITE PART FOR A VEHICLE BODY

REFERENCE TO RELATED APPLICATIONS

This application claims priority to German patent application no. 102 11 734.9, filed Mar. 14, 2002.

TECHNICAL FIELD

The invention relates to vehicle body parts, and more particularly to a composite vehicle body part.

BACKGROUND OF THE INVENTION

Composite parts have been incorporated in vehicles for reducing vehicle weight. In self-supporting vehicle bodies, composite materials are sometimes used as panels in the vehicle's body. To achieve high stability, the individual composite parts need to be fastened to a stable framework. Using a framework, however, provides an added complexity to the vehicle body structure.

It is the object of the invention to provide a composite vehicle body part that is lightweight and that can be fastened to adjacent composite parts to form a reliable, simple and stable structure.

BRIEF SUMMARY OF THE INVENTION

A composite part according to one embodiment of the invention comprises an outer wall having a front surface and a rear surface and a foamed backing attached to the outer wall at its rear surface. The outer wall of the composite part can be made of a thin plastic or metal sheet, and the foamed backing may be made of foamed plastic. A reinforcement insert is embedded in the foamed backing. The reinforcement insert has at least two fastening regions exposed through the foamed backing for fastening the composite part to an adjacent composite part.

In one embodiment, the two fastening regions are offset from each other, making it possible to arrange fastening elements in two different parallel planes and allowing several composite parts to be connected together to increase the stiffness of the structure without requiring a frame. The composite part itself is a substantially planar plate with a substantially planar outer wall. The fastening regions lie at different distances from the rear surface of the outer wall.

In another embodiment, at least a portion of the first and/or second fastening regions laterally protrudes beyond the edge of the outer wall and the foamed backing. The protruding portion forms a connecting element that allows the composite part to be fastened to a frame, an adjoining wall or an adjoining composite part without requiring additional connecting elements.

The invention is also directed to an assembly comprising at least two adjacent composite parts that are mechanically fastened to each other by connecting elements. In one embodiment, a first connecting element couples the first fastening regions of the adjacent composite parts and a second connecting element couples the second fastening regions of the composite parts. The connecting element can be a plate-like structure, a cable of glass fibers or resin-impregnated material, or an extension of the first and/or second fastening regions themselves.

The plurality of first and/or second fastening regions may be arranged to lie in one common plane, respectively. This construction allows the connecting element to be attached to a plurality of fastening regions of a composite part so that any force is distributed through a large surface area to provide additional stability.

DETAILED DESCRIPTION OF THE PREFERRED EMBODIMENTS

The invention is generally directed to a vehicle body part having a composite structure. In the description below, the term "vehicle body part" extends to any component of the vehicle, including vehicle panels and frames, as well as assemblies incorporating the inventive composite structure.

Figure 1:
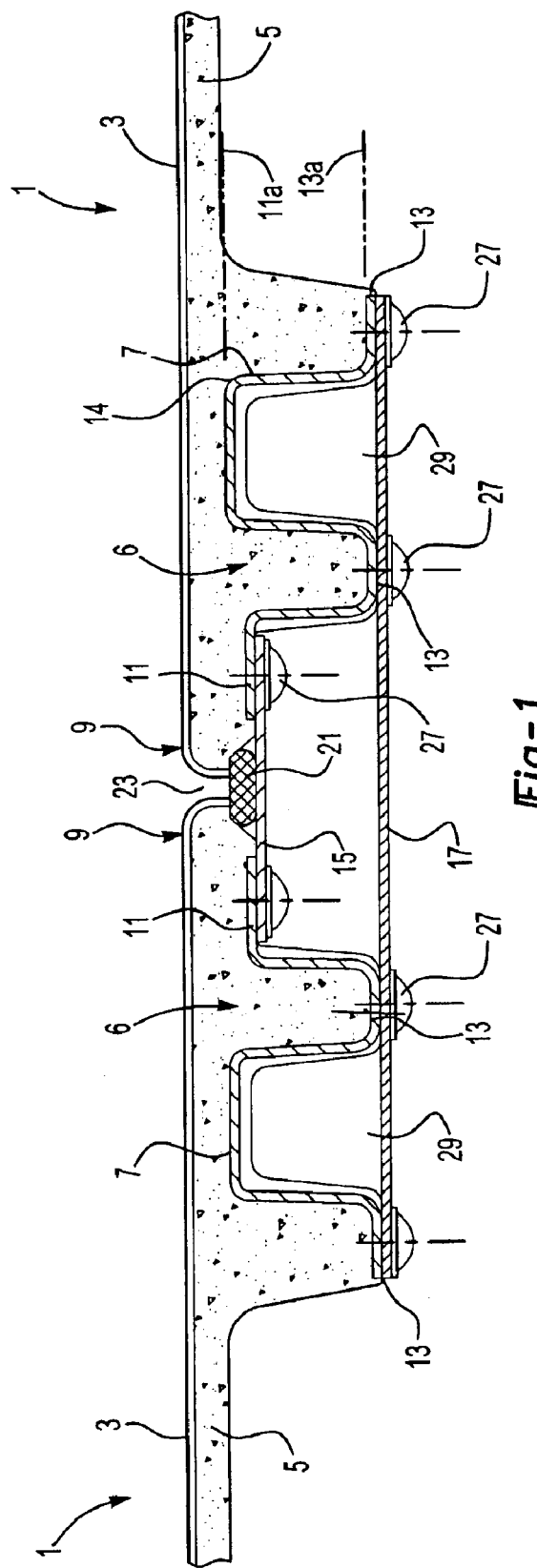
FIG. 1 is a section view of a vehicular panel according to one embodiment of the invention.
Figure 2:
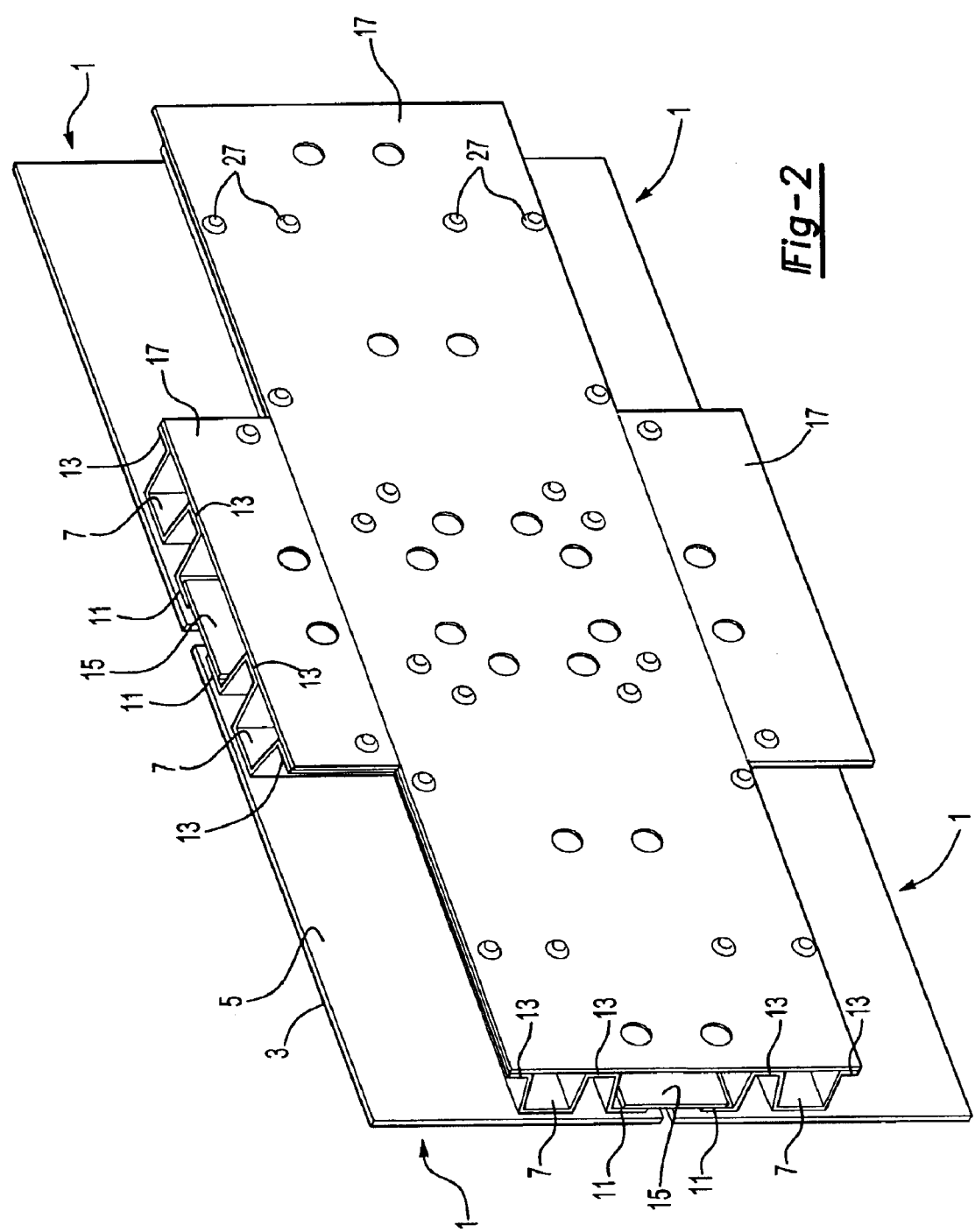
FIG. 2 shows a perspective view of the vehicular panel according to FIG. 1, as seen from the rear surface.

FIGS. 1 and 2 illustrate one embodiment of the invention. In this embodiment, two planar composite parts 1 have edges that are arranged adjacent to each other. The composite parts 1 together form a modular assembly that can be used as, for example, a vehicle body panel. Note that any number of composite parts 1 can be connected together to form panels having different sizes and shapes. The assembly shown in FIG. 1 is a portion of a vehicular panel, which can be used as a bottom, wall or ceiling of a vehicle, for example. The composite parts 1 may also be assembled to form a mountable vehicle body part or even a self-supporting vehicle frame. For simplicity, FIG. 1 is a section view of a region around adjoining edges of two adjacent composite parts coupled to each other.

The composite part 1 itself comprises an outer wall 3 with a front surface and a rear surface, a foamed backing 5 attached to the rear surface of the outer wall 3, and a reinforcement insert 7 partially embedded into the foamed backing 5. The composite part 1 may have any shape. For simplicity, the composite part 1 in the Figures is shown as a rectangle or square, but other shapes, including irregular shapes, are also possible, without departing from the scope of the invention. For clarity and illustrative purposes only, the foamed backing 5 in the region of the reinforcement insert has been partially omitted in FIGS. 2 through 4.

The outer wall 3 can be formed from a foil, such as a thin metal sheet, or other sheet material such as plastic. The foamed backing 5 may be shaped to cover substantially the entire surface area of the rear surface of the outer wall 3. In one embodiment, the foamed backing 5 is made from a foamed plastic material, such a polyurethane foam. Further, the foamed backing 5 may be impregnated with reinforcing fibers to strengthen the foamed plastic material.

The reinforcement insert 7 can be made from any substantially planar rigid material, such as sheet metal or a molded plastic sheet. In the embodiment shown in FIG. 1, the sheet metal is profiled to form trapezoidal or rectangular troughs 6. This allows the foamed backing 5 to have an uneven thickness, with the uneven surface of the foamed backings formed on the side facing away from the outer wall 3. The thicker portions of the foamed backing 5 generally follow the troughs 6 in the profile of the reinforcement insert 7. Further, the uneven surface of the reinforcement insert 7 allows portions of the insert 7 to be exposed through the foamed backing 5. Thus, different areas of the reinforcement insert 7 are arranged at different distances from the outer wall 3.

The portions of the reinforcement insert 7 that are not covered by the foamed backing 5 form fastening regions 11, 13. Thus, in this embodiment, the reinforcement insert 7 provides a dual function by stabilizing the composite part 1 and also providing a fastening structure for the part 1. The fastening regions 11, 13 allow the composite part 1 to be attached to an adjacent composite part. By incorporating a fastening structure into the reinforcement insert 7 rather than attaching a separate fastener to the part 1, any force on the fastening region 11, 13 of the insert 7 is distributed throughout the part 1, making it possible to introduce force onto the fastening structure of the part 1 without causing the fastening structure itself to detach from the composite part 1. Incorporating fastening regions 11, 13 into the reinforcement insert 1 also allows individual composite parts 1 to be interchangeable with each other in an assembly.

In one embodiment, an edge portion 9 of the reinforcement insert 7 is exposed on the rear surface of the composite part 1 to define one or more first fastening regions 11. This first fastening region is preferably flat and is disposed close to the outer wall 3. In addition, each composite part 1 has one or more second fastening regions 13 which are farther from the outer wall 3 than the first fastening regions 11. The first fastening regions 11 may lie in one common plane 11a, and the second fastening regions 13 may lie in a second common plane 13a. As shown in FIG. 1, the first plane 11a and the second plane 13a are parallel to each other and to the outer wall 3.

The first plane 11a and the second plane 13a are also offset with respect to each other and lie at different distances from the rear surface of the outer wall 3. In the embodiment shown in FIG. 1, the first plane 11a is disposed closer to the outer wall 3 than the second plane 13a. This offset allows other structures, such as fastening elements, to be attached to the fastening regions 11, 13 in different substantially parallel planes to increase the stiffness of the assembly and provide a multi-layered composite part structure. For example, non-profiled flat plates may be used as connecting elements to link fastening regions 11 and 13, respectively, from two different parts 1 to form a planar assembly having a large surface area. As will be explained in greater detail below, the planar connecting elements provide to the assembly added stiffness. In one embodiment, the second fastening regions 13 are also spaced away from the edge 9 of the composite part 1.

In one embodiment, the edge 9 of the reinforcement insert 7 extends continuously around the entire perimeter of the composite part 1.

By keeping the fastening regions 11, 13 exposed through the foamed backing 5, the fastening regions 11, 13 are easy to locate when positioning connecting elements to be attached to the fastening regions 11, 13. Further, by forming the fastening regions 11, 13 in the reinforcement insert 7 itself rather than as a separate component, the fastening elements can be directly connected to the reinforcement insert 7 when they are attached to the fastening regions 11, 13 without penetrating the foamed backing 5. This ensures that any connecting elements will remain stable due to the stability of the reinforcement insert 7.

In one embodiment, the exposed portions of the reinforcement insert 7 forming the fastening regions 11, 13 face the same direction, away from the outer wall 3. This orientation allows all of the connecting elements in the assembly to be mounted from the same side of the composite part 1.

Note that the second fastening regions 13 may be completely eliminated by covering the entire middle portion of the reinforcement insert 7 with the foamed backing 5, leaving only the edge 9 exposed to form an embedded frame acting as the first fastening region 11.

In the embodiment shown in FIG. 1, adjacent composite parts 1 are connected together through connecting elements 15 and 17, which are in the form of flat plates in this embodiment. A first connecting element 15 rests on adjacent first fastening regions 11 on the rear surface and is directly fastened to two first fastening regions 11 of the two composite parts 1 with any known fastening structure or method 27, such as screwing, welding, riveting, crimping, adhesive, etc. To maximize security, the connecting element 15 contacts the full surface area of the first fastening regions 11.

The second connecting element 17 is connected to the second fastening regions 13; in this embodiment, the second connecting element 17 is fastened to four second fastening regions 13. Note that because the first and second fastening regions 11, 13 are in two different planes 11a, 13a, a portion of the two composite parts 1 (in this case, the area where they are directly adjacent to each other) are spanned by both the first and the second connecting elements 15, 17. Because the foamed backing 5 profile follows the profile of the reinforcement insert 7, the assembly forms several channel-like recesses 29 that are bound by the reinforcement insert 7 and the connecting elements 15, 17. These recesses 29 formed by the profiled structure of the reinforcement insert 7 and the offset planes 11a, 13a enhance the stability of the assembly by forming a rigid framework from the composite parts 1 and the connecting elements 15, 17.

During a composite part assembly process according to one embodiment of the invention, the first connecting element 15 is attached to the first fastening regions 11. An optional sealing band 21 may then used to fill in a gap 23 between adjacent edges 9 of the composite parts 1 being joined together, if needed. The second connecting element 17 is then attached to the second fastening regions 13.

Figure 3:
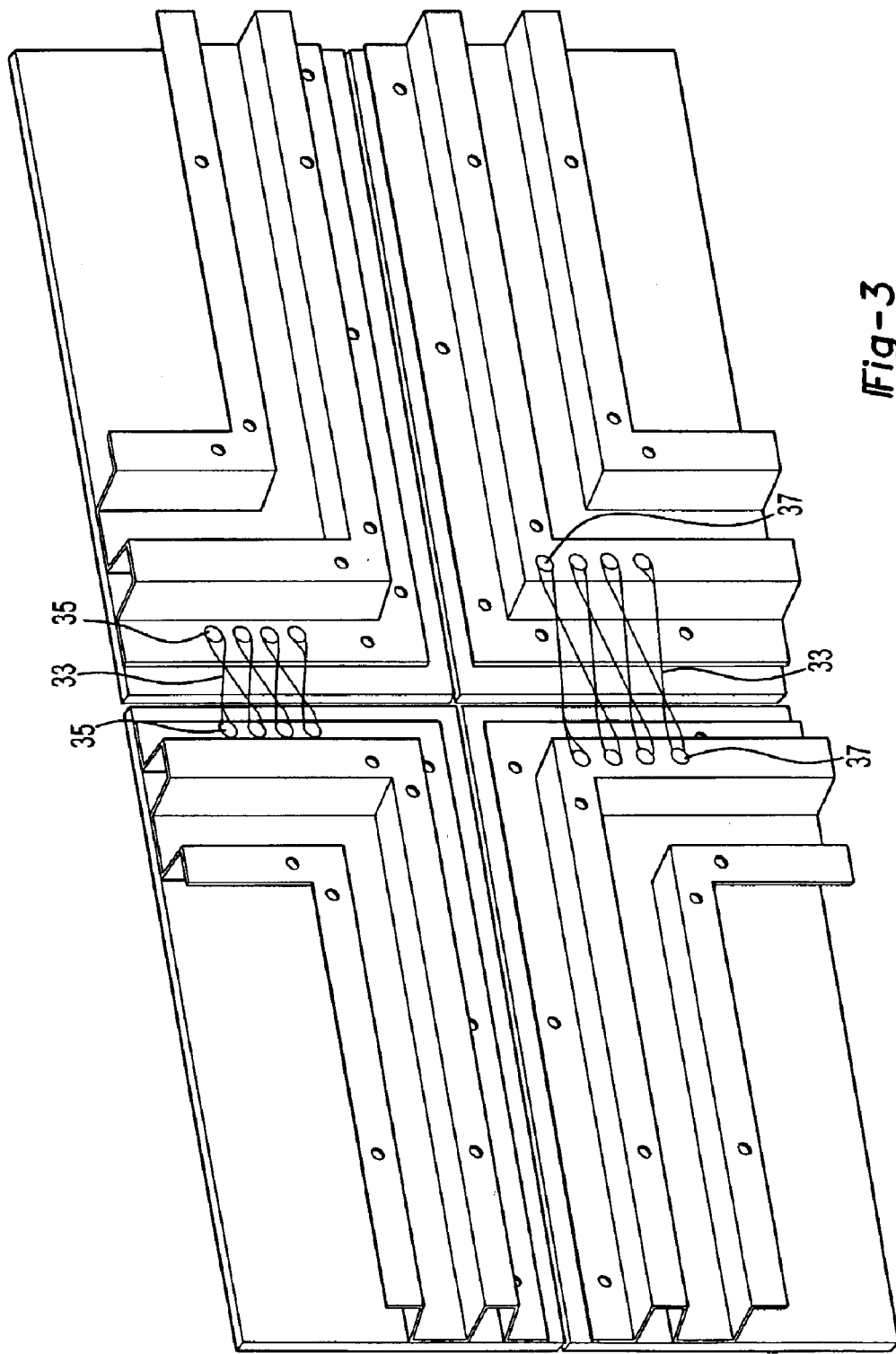
FIG. 3 shows a perspective view of the rear surface of a vehicular panel according to a second embodiment of the invention.

FIG. 3 illustrates an alternative structure for fastening two adjacent composite parts 1 to each other. In this embodiment, a cable 33 made of glass fibers impregnated with resin is used as a connecting element. The band or cable 33 is laced around protrusions 35 and 37, which extend from the first and second fastening regions 11 and 13, respectively, and which act as supports for the cable 33. The protrusions 35, 37 may have hooks that further engage the cable 33.

Figure 4:
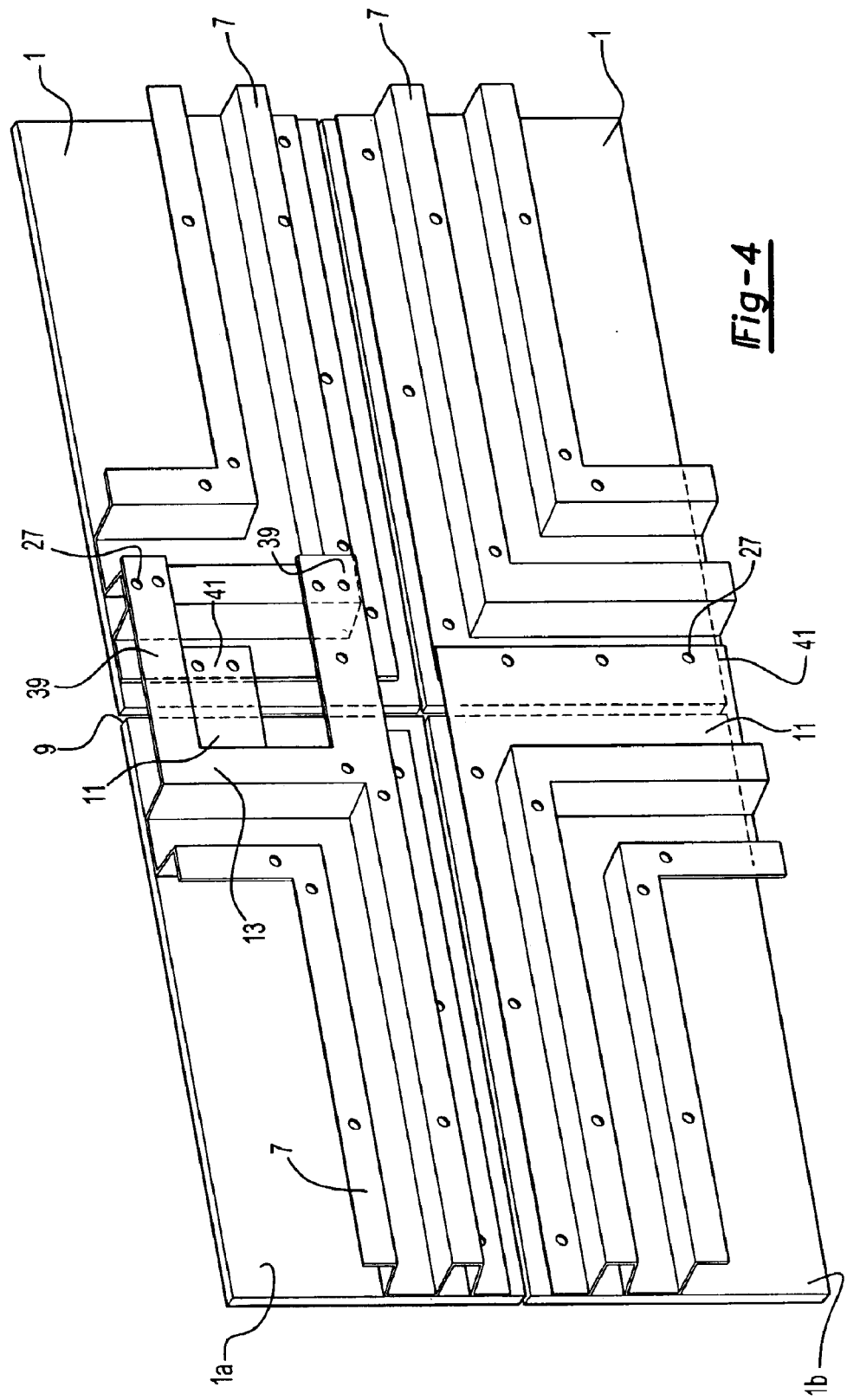
FIG. 4 shows a perspective view of the rear surface of a vehicular panel according to a further embodiment of the invention.

FIG. 4 illustrates an alternative configuration for the reinforcement insert 7. The reinforcement insert 7 in the upper, left-hand composite part 1a has one or more first projecting portions 41 connected to the first fastening region 11. The first fastening region 11 and the projecting portion 41 are integrally formed together as one piece such that the projecting portion 41 acts as an extension of the first fastening region 11. The first projecting portion 41 extends toward an adjacent composite part 1 (the upper right-hand composite part 1 in this example) beyond the edge 9 of the composite part 1a as defined by the outer wall 3 and foamed backing 5. The first projecting portion 41 serves the same purpose as the first connecting elements 15 in the embodiment shown in FIG. 1, overlapping the first fastening region 11 of the adjacent composite part 1. The first projecting portion 41 rests directly on the first fastening region 11 and can be fastened thereto by the types of connection which have been mentioned above. An additional or alternative second projecting portion or portions 39 may extend from the second fastening region 13.

The projecting portions 39, 41 act like the connecting element plates described above, but they are formed integrally with the fastening regions 11, 13 and eliminate the need for separate connecting element plates. The projecting portions 39, 41 may even extend across the entire lateral length of the reinforcement insert 7. An example of this is shown on the lower, left-hand composite part 1b in FIG. 4, where the projecting portion 41 extends along the entire vertical length of its corresponding first fastening region 11.

In this embodiment, is also important that the projecting portions 39, 41 in one composite part are disposed at slightly different levels than the fastening regions 11, 13 in the adjacent composite part 1. Preferably, the plane of the projecting portions 39, 41 is slightly above the plane of the fastening regions 11, 13 at a distance equivalent to the thickness of the reinforcement insert 7 material so that the projecting portions 39, 41 will rest directly on the corresponding fastening regions 11, 13 of the adjacent composite part 1. This slight offset will ensure that the outer surfaces of the outer walls 3 of the adjacent composite parts 1 will lie in the same plane once the two composite parts 1.

In another embodiment, both adjacent composite parts 1 have projecting portions 39, 41 extending beyond their respective edges 9 toward each other. With this structure, an interlocking or frictional fit connection can link the two composite parts.

In a further embodiment, the edge of the composite part is formed by the outer wall 3 and/or the foamed backing 5. At least a section of the first and/or second fastening regions laterally protrudes beyond this edge. The portion of the reinforcement insert 7 that laterally protrudes beyond the edge forms a connecting element that can be fastened to a frame, an adjoining wall or to an adjoining composite part without requiring additional plates. The adjoining composite parts are therefore aligned at least in one direction using this structure.

Note that, as shown in FIG. 1, the first and/or second fastening regions may be arranged so that a plurality of first and/or second fastening regions each lie in their own respective common planes. This construction allows a connecting plate to be attached to the reinforcement insert 7 via more than one fastening region in the composite part 1, thereby distributing any forces on the composite part over a larger surface area in the reinforcement insert 7.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A composite part, comprising
an outer wall having a front surface and a rear surface;
a foamed backing attached to the rear surface of the outer wall; and
a reinforcement insert embedded in the foamed backing, the reinforcement insert having a first fastening region and a second fastening region,
wherein the first fastening region is at a first distance from the rear surface of the outer wall and the second fastening region is at a second distance from the rear surface of the outer wall, wherein the second distance is longer than the first distance.

2. The composite part of claim 1, wherein the first and second fastening regions are exposed by the foamed backing.

3. The composite part of claim 2, wherein the first and second fastening regions face in the same direction.

4. The composite part of claim 1, wherein the reinforcement insert is made from a material selected from the group consisting of metal and plastic.

5. The composite part of claim 1, wherein the reinforcement insert is formed as a profiled sheet.

6. The composite part of claim 5, wherein the profiled sheet is formed to have at least one trough.

7. The composite part of claim 6, wherein said at least one trough has a profile selected from the group consisting of a rectangle and a trapezoid.

8. The composite of claim 1, wherein the reinforcement insert is exposed along an edge of the composite part to form the first fastening region.

9. The composite part of claim 8, wherein the second fastening region is spaced farther away from the edge than the first fastening region.

10. The composite part of claim 1, wherein the reinforcement insert has a plurality of first fastening regions, wherein said plurality of first fastening regions lie in a first plane.

11. The composite part of claim 10, wherein the reinforcement insert has a plurality of second fastening regions, wherein said plurality of second fastening regions lie in a second plane, and wherein the first plane is closer to the rear surface of the outer wall than the second plane.

12. The composite part of claim 1, wherein the reinforcement insert has a plurality of second fastening regions, wherein said plurality of second fastening regions lie in a single plane.

13. The composite part of claim 1, wherein the outer wall and the foamed backing define an edge, and wherein at least one of said first and second fastening regions has a projecting portion that extends beyond the edge.

14. The composite part of claim 13, wherein the projecting portion extends along an entire length of the edge of the composite part.

15. The composite part of claim 1, wherein the composite part is a vehicle part.

16. The composite part of claim 1, wherein the front and rear surfaces of the outer wall are planar.

17. The composite part of claim 1, wherein the foamed backing comprises a foamed plastic.

18. The composite part of claim 17, wherein the foamed backing further comprises reinforcing fibers embedded in the foamed plastic.

19. A composite part assembly for a vehicle, comprising
a first composite part;
a second composite part adjacent the first composite part, the first and second composite parts each comprising
an outer wall having a front surface and a rear surface,
a foamed backing attached to the rear surface of the outer wall,
a reinforcement insert embedded in the foamed backing, the reinforcement insert having a first fastening region and a second fastening region exposed by the foamed backing,
wherein the first fastening region is at a first distance from the rear surface of the outer wall and the second fastening region is at a second distance from the rear surface of the outer wall, wherein the second distance is longer than the first distance;
a first connecting element attached to the first fastening region of the first composite part and the first fastening region of the second composite part; and a second connecting element attached to the second fastening region of the first composite part and the second fastening region of the second composite part, wherein the first connecting element and the second connecting element hold the first and second composite parts together to form the composite part assembly.

20. The assembly of claim 19, wherein the outer wall and the foamed backing of the first composite part defines a first edge and the outer wall and the foamed backing of the second composite part define a second edge, and wherein at least one of said first and second fastening regions in the first composite part has a projecting portion that extends beyond the first edge to cross the second edge and overlap at least one of said first and second fastening regions in the second composite part.

21. The assembly of claim 20, wherein the projecting portion extends along an entire length of the first edge of the first composite part.

22. The assembly of claim 19, wherein at least one of the first connecting element and second connecting element is a plate.

23. The assembly of claim 22, wherein at least one of the first and second connecting elements is attached to a plurality of first fastening regions and second fastening regions, respectively.

24. The assembly of claim 19, wherein the first and second connecting elements are a first projecting portion extending from the first fastening region and a second projecting portion extending from the second fastening region, respectively, wherein the first and second projecting portions engage each other to connect the first and second composite parts.

25. The assembly of claim 24, wherein the first and second projecting portions engage each other by a connection structure selected from the group consisting of an interlocking fit and a frictional fit.

26. The assembly of claim 19, wherein at least one of the first and second connecting elements is a cable.

27. The assembly of claim 26, wherein the first fastening regions of the first and second composite parts have a first set of protrusions and the second fastening regions of the first and second composite parts have a second set of protrusions, wherein the cable is laced around at least one of said first set of protrusions and said second set of protrusions to connect the first and second composite parts.

28. The assembly of claim 26, wherein the cable is one selected from the group consisting of a plurality of glass fibers and a resin-impregnated material.

29. The assembly of claim 19, wherein the foamed backing comprises a fiber-reinforced foamed plastic.

30. A vehicular panel, comprising a first composite part;

a second composite part adjacent the first composite part, the first and second composite parts each comprising
a planar outer wall having a front surface and a rear surface,
a foamed backing attached to the rear surface of the outer wall, wherein the foamed backing comprises a fiber-reinforced foamed plastic,
a reinforcement insert embedded in the foamed backing, the reinforcement insert having a first fastening region and a second fastening region exposed by the foamed backing,
wherein the first fastening region is at a first distance from the rear surface of the outer wall and the second fastening region is at a second distance from the rear surface of the outer wall, wherein the second distance is longer than the first distance, a first connecting element plate attached to the first fastening region of the first composite part and the first fastening region of the second composite part;

a second connecting element plate attached to the second fastening region of the first composite part and the second fastening region of the second composite part, wherein the first connecting element plate and the second connecting element plate hold the first and second composite parts together to form the vehicular panel.

\* \* \* \* \*